United States Patent [19]

Sakai et al.

[11] Patent Number: 5,197,583
[45] Date of Patent: Mar. 30, 1993

[54] TORQUE TRANSMISSION DEVICE

[75] Inventors: Toshifumi Sakai; Hiroshi Takuno, both of Aichi, Japan

[73] Assignee: Toyoda Koki Kabushiki Kaisha, Kariya, Japan

[21] Appl. No.: 762,459

[22] Filed: Sep. 19, 1991

[30] Foreign Application Priority Data

Oct. 11, 1990 [JP] Japan .................. 2-276619

[51] Int. Cl.$^5$ .................. F16D 43/28; F16D 25/0638; B60K 17/35
[52] U.S. Cl. .................. 192/35; 192/58 C; 192/85 AA; 192/103 F
[58] Field of Search .................. 192/85 AA, 103 F, 35, 192/57, 58 C

[56] References Cited

U.S. PATENT DOCUMENTS

| 4,719,998 | 1/1988 | Hiramatsu et al. | 192/103 F X |
| 4,773,517 | 9/1988 | Watanabe | 192/103 F X |
| 4,821,604 | 4/1989 | Asano | 192/103 F X |
| 4,846,298 | 7/1989 | Naito | 180/233 |
| 4,905,808 | 3/1990 | Tomita et al. | 192/85 AA |
| 4,909,371 | 3/1990 | Okamoto et al. | 192/103 F |
| 5,031,743 | 7/1991 | Morishita et al. | 192/58 C |

FOREIGN PATENT DOCUMENTS

| 0283821 | 9/1988 | European Pat. Off. . |
| 0319722 | 10/1990 | European Pat. Off. . |
| 3814472 | 11/1988 | Fed. Rep. of Germany . |
| 3826256 | 3/1989 | Fed. Rep. of Germany . |
| 776210 | 1/1935 | France | 192/58 C |
| 63-240429 | 10/1988 | Japan . |

Primary Examiner—Richard Lorence
Attorney, Agent, or Firm—Oblon, Spivak, McClelland, Maier & Neustadt

[57] ABSTRACT

A torque transmission device coaxially arranged between a pair of rotary shafts transmits rotational torque in response to relative rotation therebetween. This device includes an outer cylindrical housing coupled to one of the rotary shafts for rotation therewith, wherein the outer cylindrical housing receives an inner sleeve shaft coupled to the other of the rotary shafts for rotation therewith, and multiple friction disc clutch which transmits rotational torque between the inner sleeve shaft and the outer cylindrical housing. In the torque transmission device, there are also an actuation piston making the multiple friction disc clutch be in engagement and a pressure generating mechanism generating a pressure according to the relative rotation between the outer cylindrical housing and the inner sleeve shaft to make the actuation piston move toward the clutch. Further, the torque transmission device has a pressure controlling mechanism which controls the pressure in the clutch chamber receiving the clutch so that the characteristic of the torque transmission device is changed.

5 Claims, 4 Drawing Sheets

TORQUE TRANSMISSION DEVICE

BACKGROUND OF THE INVENTION

1. Field of the Invention

The present invention relates to a device for torque transmission between a pair of rotary members coaxially arranged.

2. Discussion of the Prior Art

This kind of torque transmission device is used as a connection mechanism for effecting torque transmission in response to relative rotation between a pair of rotary shafts coaxially arranged and is also used as a limiting mechanism for limiting difference in rotation between two rotary members. In the former use, the torque transmission device is disposed in a torque transmission system of a four-wheel drive vehicle. In the latter use, the limiting mechanism is disposed in the differential gear unit of a vehicle.

As shown in Japanese Laid-open Patent Publication No. 63-240429, the prior torque transmission device is arranged between a pair of rotary shafts coaxially arranged for relative rotation. The device connects the rotary shafts each other for torque transmission in response to relative rotation therebetween. The device includes a cylindrical housing connected to one of the rotary shafts for rotation therewith, an inner rotary member drivingly connected to the other of the rotary shafts, a multiple friction disc clutch assembled within the housing for effecting torque transmission between the cylindrical housing and the inner rotary member by frictional engagement and a thrust mechanism assembled within the housing for producing a thrust force in accordance with relative rotation between the cylindrical housing and the inner rotary member and applying it to said friction disc clutch.

The thrust mechanism includes an actuation piston which is axially slidably coupled to the cylindrical housing for rotation therewith and forms a clutch chamber receiving the friction disc clutch. The actuation piston is in engagement with the friction disc clutch at one side thereof.

The thrust mechanism also includes a pressure chamber, which is formed at the other side of the actuation piston by the cylindrical housing and the actuation piston. The pressure chamber is filled with an amount of viscous fluid, and a rotor coupled to the inner rotary member in the pressure chamber for rotation therewith, the rotor being integrally formed with a plurality of circumferentially spaced radial blades.

In this kind of torque transmission device, relative rotation between a pair of rotary shafts causes relative rotation between the actuation piston and the rotor. As a result, the viscous fluid in the fluid chamber is compulsorily moved by the blades of the rotor. This produces an internal pressure acting on the actuation piston. Thus, the actuation piston moves toward the friction disc clutch, thereby causing said friction disc clutch to generate an engagement force for effecting drive connection between the rotary shafts. The engagement force is in proportion to the difference in rotation between the rotary shafts and torque in proportion to the difference in rotation is transmitted therebetween.

In the case that said torque transmission device is used in the four-wheel drive vehicle, the driving power is transmitted in accordance with the difference in rotation between front and rear wheels.

In the prior torque transmission device it was impossible to change the characteristic in the torque transmission. However, for the following reason, a new torque transmission device has been desired which can change its transmission characteristic. That to say, it has been hoped to change the distribution ratio of the driving torque to front and rear wheels according to the driving condition of the vehicle. Therefore, the transmission characteristic of the torque transmission device is required to be controllable in accordance with an instruction by the driver or a computer. However, the prior torque transmission device cannot satisfy the above requirement because of its fixed characteristic. The characteristic in the torque transmission is also required to be positively controlled by the computer for eliminating tight-corner braking phenomenon and interference with an antilock braking system.

SUMMARY OF THE INVENTION

Accordingly, the present invention provides an improved torque transmission device which can transmit rotational torque according to a difference in rotation between the housing and rotary member thereof, and can change its transmission characteristic according to the driving condition of the vehicle or the like.

Briefly, an improved torque transmission device according to the present invention comprises a cylindrical housing rotatable about an axis, a rotary member coaxially received in the cylindrical housing for rotation about the axis, an actuation piston axially slidably received in the cylindrical housing and defining a clutch chamber between the cylindrical housing and the rotary member, a friction clutch assembled within the clutch chamber and transmitting rotational torque between the cylindrical housing and the rotary member in response to a thrust force transmitted from the actuation piston, a means for generating a pressure in response to relative rotation between the cylindrical housing and the rotary member to move the actuation piston in the direction toward the clutch chamber, a fluid filled with the clutch chamber, and means for controlling the pressure of the fluid in the clutch chamber to change the characteristic in torque transmission.

In a preferred embodiment, there is provided a source of pressurized fluid, a passage connecting the fluid source and the clutch chamber and a control valve for controlling the fluid pressure in the clutch chamber.

In such a torque transmission device the pressure in the clutch chamber is controlled by the pressure controlling means, whereby the engagement state of the friction disc clutch is changed. Namely, when a pressure acting on the actuation piston is generated in response to a relative rotation between the cylindrical housing and the rotary member, the actuation piston is moved toward the friction clutch by a force corresponding to a pressure difference between generated pressure and the pressure in the clutch chamber. Therefore, even if the generated pressure is constant, i.e., a constant relative rotation occurs between the cylindrical housing and the rotary member, the engagement state of the friction clutch changes in proportion to the pressure in the clutch chamber.

So it is possible to change the engagement state of the friction disc clutch, in response to the driving condition of the vehicle or the like.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENT

Figure 1:
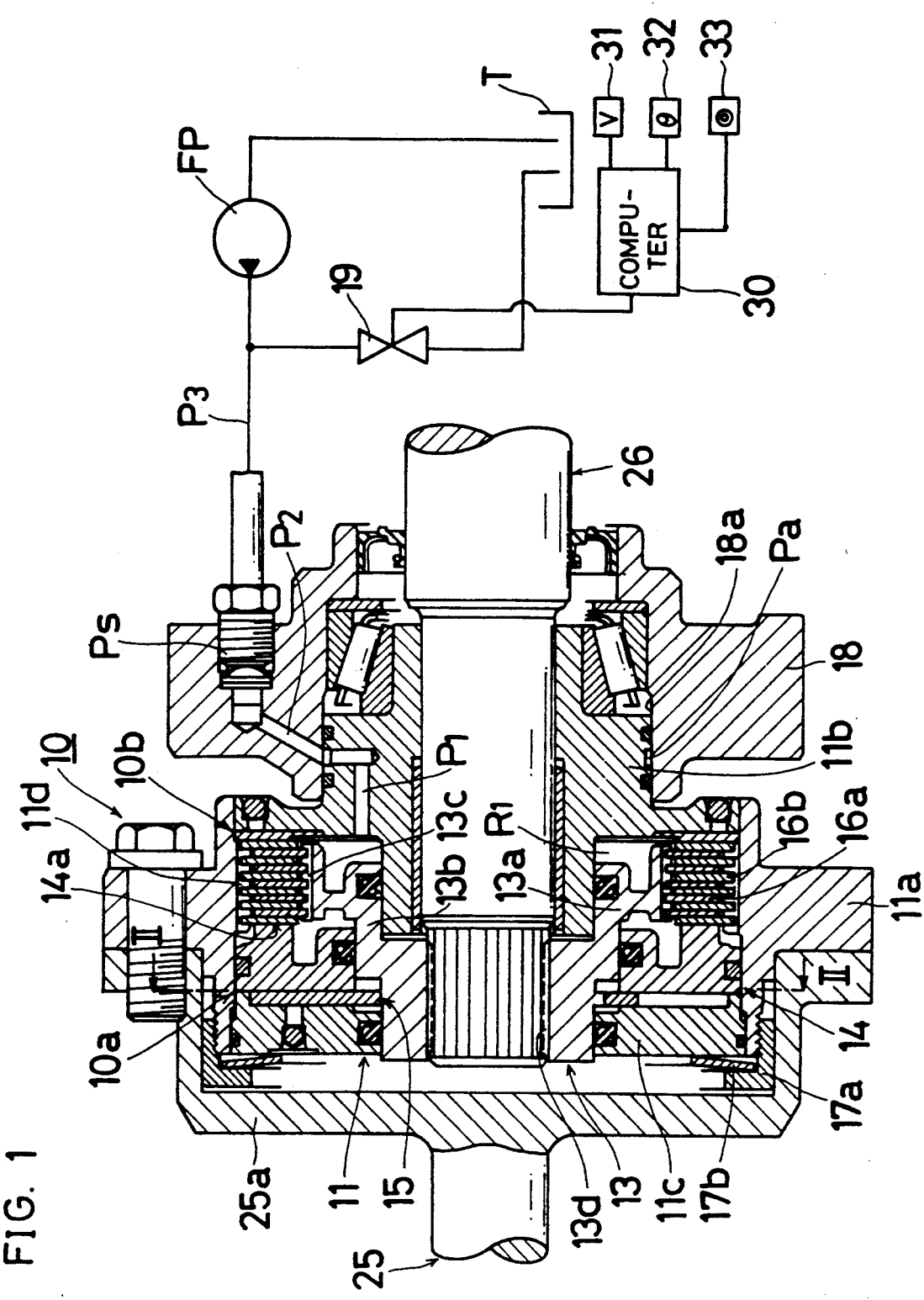
FIG. 1 is a sectional view of a torque transmission device according to an embodiment of the present invention.
Figure 3:
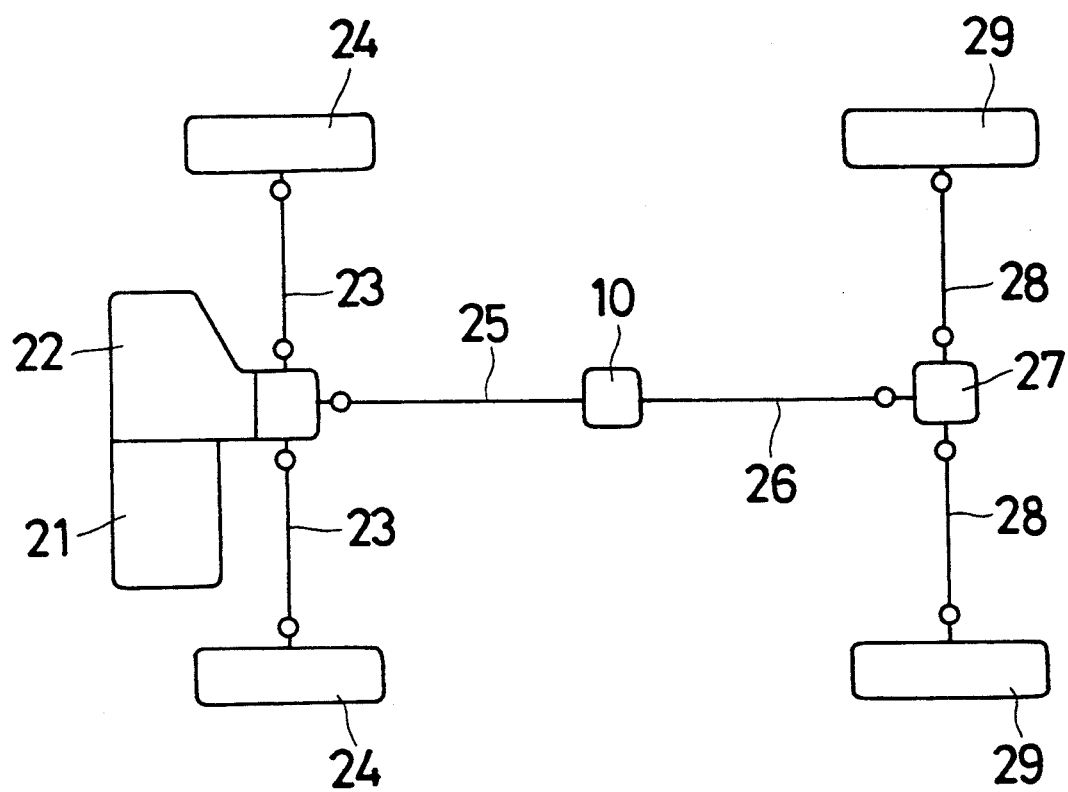
FIG. 3 is a schematic representation of a four-wheel drive drive vehicle which includes the torque transmission device shown in FIG. 1 and 2.

Referring now to the drawings, FIG. 1 shows a torque transmission device 10 according to an embodiment of the present invention. The torque transmission device 10 is disposed in a rear-wheel drive system of a four-wheel drive vehicle, as shown in FIG.3.

In the vehicle front road wheels are always driven and rear road wheels are driven only in case of need. The power from a prime mover 21 is transmitted to a set of front road wheels 24 through a transaxle 22 and a pair of split axle shafts 23. The transaxle 22 includes a power transmission in drive connection to the prime mover 21, and a power transfer device combined with the power transmission.

The rear-wheel drive system includes a first propeller shaft 25 drivingly connected to the power transfer device of transaxle 22, a second propeller shaft 26 drivingly connected to the first propeller shaft 25 through the torque transmission device 10, a rear-wheel differential 27 in drive connection to the second propeller shaft 26, and a pair of axle shafts 28 drivingly connected at their one ends to the rear-wheel differential 27 and at the other ends to a set of rear road wheels 29. Thus, the torque transmission device 10 acts to transmit the power from the first propeller shaft 25 to the rear road wheels 29 through the second propeller shaft 26, rear-wheel differential 27 and split axle shafts 28.

As shown in FIG. 1, the torque transmission device 10 comprises a thrust mechanism 10a and a multiple friction disc clutch 10b within an annular space which is formed by an outer cylindrical housing 11, and an inner sleeve shaft 13. The outer cylindrical housing 11 has a cylindrical body 11a, a first end cover 11b fixed to one open end of the cylindrical body 11a, and a second end cover 11c fitted into the other open end of the cylindrical body 11a. The second end cover 11c is axially movable with respect to the cylindrical body 11a.

The second propeller shaft 26 penetrates the first end cover 11b and is spline-engaged with the inner sleeve shaft 13 at 13d for rotation therewith, while the outer cylindrical housing 11 is secured to a flanged rear end 25a of the first propeller shaft 25 for rotation therewith. The inner sleeve shaft 13 has a flanged portion 13a which projects within the annular space and a stepped sleeve portion 13b. The flanged portion 13a is externally splined at 13c.

The thrust mechanism 10a comprises an actuation piston 14 axially slidably fitted in a fluid-tight manner on the stepped sleeve portion 13b of the inner sleeve shaft 13. The outer peripheral surface of the actuation piston 14 touches the inner surface of the outer cylindrical body 11a in a fluid-tight manner. The actuation piston 14 divides the annular space within the cylindrical housing 11 to form a clutch chamber R1 at one side thereof and a pressure chamber R2 at the other side thereof.

The friction disc clutch 10b is composed of a first set of clutch discs 16a and a second set of clutch discs 16b both of which are received in the clutch chamber R1. The first set of clutch discs 16a are axially slidably engaged with the externally splined portion 13c of the flanged portion 13a of the inner sleeve shaft 13 for rotation therewith, while the second set of clutch discs 16b are axially slidably engaged at their outer peripheries with an internally splined portion 11d of the cylindrical body 11a for rotation therewith and interleaved with the first set of clutch discs 16a. The actuation piston 14 is engaged with the clutch discs 16a at 14a.

Figure 2:
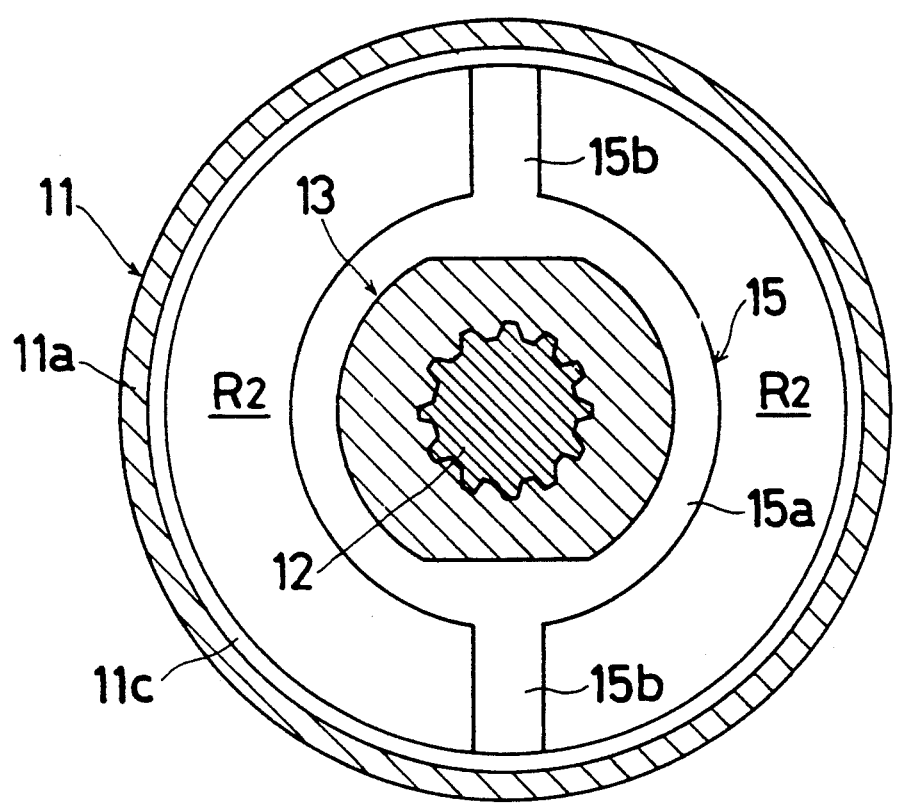
FIG. 2 is a cross sectional view taken along line II—II of FIG. 1.

In the pressure chamber R2 a rotor 15 is mounted on the periphery of the inner sleeve shaft 13 for rotation therewith. As shown in FIG. 2, the rotor 15 has an annular hub portion 15a mounted on the inner sleeve shaft 13 for rotation therewith, and a pair of radial blades 15b diametrically extending from the annular hub portion 15a and circumferentially spaced from one another at 180°. The end of the radial blades 15b, which slides with the inner surface of cylindrical body 11a of the outer cylindrical housing 11, divide the pressure chamber R2 into two spaces. The pressure chamber R2 stores therein an amount of high viscous fluid such as silicone oil and a little air.

In the torque transmission device of the present invention, a retainer ring 17a is movably screwed to the outer periphery of the other open end of the cylindrical body 11a and a ringed spring 17b is inserted between the retainer ring 17a and an outer end surface of the second end cover 11c. The spring 17b thrusts the actuation piston 14 in the axial direction toward the multiple friction disc clutch 10b through the second end cover 11c, whereby the actuation piston contacts with the multiple friction disc clutch 10b. Further, the sleeve portion of the first end cover 11b is rotatably fitted into a cylindrical bore 18a of a bracket 18 which is fixed to the vehicle.

A first passage P1 is formed in the first end cover 11b of the outer cylindrical housing 11 and one end thereof is led to the clutch chamber R1, while the other end of the first passage P1 is also led to annular passage Pa formed at the outer periphery of the first end cover 11b. Further, a second passage P2 is formed in the bracket 18. An inner end thereof is led to the cylindrical bore 18a at a location corresponding to that of the annular passage Pa while the other end thereof is led to a supply port Ps formed at a rear side of the bracket 18. With this arrangement the first and second passages P1 and P2 are always connected through the annular passage Pa regardless of the rotation of the cylindrical housing 11. The supply port Ps is connected to a fluid pump FP incorporated in the vehicle through a third passage P3. Also connected to the third passage P3 is a fluid control valve 19 which bypasses a part of the pressurized fluid to a tank T. The fluid control valve 19 is a solenoid valve capable of changing its valve opening area in accordance with a control signal. Accordingly, the fluid pressure in clutch chamber R1 can be controlled by the control valve 19 and thrust force acting on the actuation piston 14 toward the retainer ring 17a is controlled.

In this embodiment, the fluid control valve 19 is controlled by a computer 30 to which a speed sensor 31, a steering angle sensor 32 and a control switch 33 are connected. The computer 30 automatically judges the driving condition of the vehicle based on the vehicle speed detected by the speed sensor 31 and the steering angle detected by the steering angle sensor 32, and adjusts the valve opening area of the control valve 19 in accordance with the judged driving condition.

In addition to the automatic mode, the computer 30 may have a manual mode in which the driver can set, using the control switch 33, the distribution ratio of the driving torque to the front wheels and the rear wheels. In this manual mode the computer 30 adjusts the control valve 19 in accordance with the angular position of the control switch 33.

In such torque transmission device 10, the thrust force of the spring 17b applied to the actuation piston 14 is adjusted by moving the retainer ring in the axial direction. The actuation piston 14 is initially contacted with the multiple friction disc clutch 10b with a predetermined thrust force sufficient for causing the multiple friction disc clutch 10b to be in locked condition when the pressure in the clutch chamber R1 is zero.

The operation of the torque transmission device shown in FIG. 1 and 2 is as follows. Assuming that there occurs relative rotation between the propeller shafts 25 and 26 during travel of the vehicle, relative rotation occurs between the outer cylindrical housing 11 fitted to the first propeller shaft 25 for rotation therewith and inner sleeve shaft 13 rotatably with the second propeller shaft 26. Thus, in the fluid chamber R2 of the thrust mechanism 10a the high viscous fluid is compulsorily moved in a circumferential direction at a speed proportional to the difference in rotation between the propeller shafts 25 and 26. As a result, internal pressure is generated by the flow resistance of viscous fluid. The internal pressure in proportion to the difference in rotation is applied to the actuation piston 14. As a result, the actuation piston 14 is moved toward the multiple friction disc clutch 10b so that each of the clutch discs 16a and the clutch plates 16b are frictionally engaged in cases where the clutch discs 16a and the clutch plate 16b are not engaged with each other in the initial state. In cases where the clutch discs 16a and the clutch plates 16b are engaged from the beginning engagement force thereof are increased. Therefore, the torque transmission device 10 transmits a rotational torque in proportion to the difference in rotation from the outer cylindrical housing 11 to the inner sleeve shaft 13 for effecting drive connection between the propeller shafts 25 and 26 whereby the vehicle is in a four-wheel drive mode. During four-wheel drive mode, the torque transmission device 10 permits differential rotation of the front and rear road wheels so as to eliminate the occurrence of a tight-corner braking phenomenon.

As explained above, in the torque transmission device 10 of the present invention, the computer 30 is able to change the fluid pressure in the clutch chamber R1 by way of suitable adjustment of the opening area of the control valve 19. Thus, the change of the fluid pressure in clutch chamber R1 (internal pressure) leads change of the thrust force of the actuation piston 14 toward the multiple friction disc clutch 10b, whereby the engagement force of the multiple friction disc clutch 10b is changed.

Figure 4:
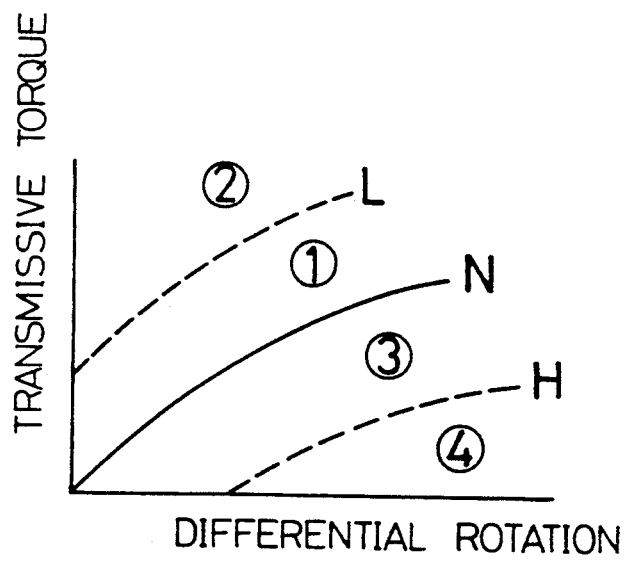
FIG. 4 is a graph which shows relationship between difference in rotation and transmissive torque.

FIG. 4 presents three curves H, N and L which shows the relation between differential rotation and transmissive torque when the internal pressure in clutch chamber R1 is changed to three levels. The three curves H, N, and L represents the cases where the internal pressure in clutch chamber R1 is high, middle, and low, respectively. The initial thrust force of the actuation piston 14 toward the multiple friction disc clutch 10b is low in the characteristic of curve H and is standard or medium in the characteristic of curve N, and is high in the characteristic of curve L. Thus, zones above the curve N are defined as zones 1 and 2, respectively, while zones below the curve N are defined as zones 3 and 4, respectively. A characteristic of transmitting high torque is obtained in the zone 1, and a characteristic of transmitting low torque is obtained in the zone 3. Further, in the zone 2 the multiple friction disc clutch 10b is engaged or nearly engaged to be locked condition and a characteristic of transmitting a very high torque is obtained therein, while in the zone 4 the multiple friction disc clutch 10b is scarcely or not engaged at all to be free condition and a characteristic of transmitting a very low torque or no torque is obtained therein.

When the control valve 19 is automatically adjusted by the computer 30, the computer 30 inputs a data from a speed sensor 31 or steering angle sensor 32 and detects the driving condition of the vehicle to adjust the control valve 19. For example under the condition where the speed is low and the steering angle is large, the internal pressure in the clutch chamber R1 is increased so that transmissive torque is decreased for preventing the occurrence of tight-corner braking phenomenon. When an ABS (anti-lock braking system) of the vehicle operates, the internal pressure in the clutch chamber R1 is also increased so that transmissive torque is decreased to eliminate interference with the ABS.

Such torque transmission device 10 has a characteristic in torque transmission which is changed in accordance with the desire of the driver or the driving condition of the vehicle. So, the four-wheel drive vehicle is kept in the optimal condition taking the driving condition of the vehicle into consideration. Further, this torque transmission device 10 makes it possible to raise the performance of the vehicle for escaping from being stuck and the performance for driving under bad conditions. Still further, this torque transmission device makes it possible to absorb circular torque peculiar to four-wheel drive, which is a cause of tight-corner braking phenomenon and other problems. Also the vehicle with an ABS makes it possible to eliminate the interference between four-wheel system and ABS.

Obviously, numerous modifications and variations of the present invention are possible in light of the above teachings. It is therefore to be understood that within the scope of the appended claims, the present invention may be practiced otherwise than as specifically described herein.

What is claimed is:

1. A torque transmission device for transmitting a rotational torque comprising:
   a cylindrical housing rotatable about an axis;
   a rotary member coaxially received in the cylindrical housing for rotation about the axis;
   an actuation piston axially slidably received in said cylindrical housing and defining a clutch chamber between said cylindrical housing and said rotary member;

a friction clutch assembled within said clutch chamber and transmitting rotational torque between said cylincrical housing and said rotary member in response to a thrust force transmitted from said actuation piston;

means for generating a pressure in response to relative rotation between said cylindrical housing and said rotary member to move said actuation piston in a direction toward said clutch chamber;

a fluid filled within said clutch member; and means responsive to at least one detected condition and including at least one fluid passage connected to said clutch chamber for controlling the pressure of said fluid in said clutch chamber to change to characteristic in torque transmission.

2. A torque transmission device as set forth in claim 1, wherein said pressure generating means comprises:

a rotor received in a pressure chamber which is formed at the opposite side of said actuation piston with respect to said clutch chamber, said rotor having at least one radial blade extending in a radial direction therefrom, and being rotated by said rotary member; and a high viscous fluid filled within said pressure chamber for pressure generation.

3. A torque transmission device as set forth in claim 2, wherein said viscous fluid is silicone oil.

4. A torque transmission device as set forth in claim 3, wherein said pressure controlling means comprises:

a fixed bracket mated with said cylindrical housing for relative rotation therebetween and having a supply port for receiving a pressurized fluid, said fluid passage being formed in said bracket and in said cylindrical housing to connect said clutch chamber and said supply port each other regardless of rotation of said cylindrical housing;

a supply source supplying said supply port with a pressurized fluid; and a control valve disposed between said supply source and said supply port for controlling the pressure of fluid which is supplied to said supply port.

5. A torque transmission device as set forth in claim 1 including a spring positioned for engaging the friction clutch, wherein the pressure of the fluid in the clutch chamber acts in a direction opposite to the pressure of said spring.

* * * * *